United States Patent [19]

Haupt et al.

[11] 4,359,123
[45] Nov. 16, 1982

[54] ADJUSTABLE POWER STEERING MECHANISM

[75] Inventors: Robert C. Haupt, Wauwatosa; George E. Kaiser, West Allis, both of Wis.

[73] Assignee: Allis-Chalmers Corporation, Milwaukee, Wis.

[21] Appl. No.: 247,844

[22] Filed: Mar. 26, 1981

Related U.S. Application Data

[63] Continuation of Ser. No. 72,831, Sep. 6, 1979, abandoned.

[51] Int. Cl.³ ............................................. B62D 7/16
[52] U.S. Cl. .............................. 180/159; 180/DIG. 2
[58] Field of Search ............... 180/159, 160, DIG. 2; 403/109, 379

[56] References Cited

U.S. PATENT DOCUMENTS

| 864,329 | 8/1907 | North | 403/109 |
| 2,047,325 | 7/1936 | Jones | 403/109 |
| 2,826,258 | 3/1958 | Livers | 180/159 |
| 3,527,316 | 9/1970 | Jones | 180/160 |
| 3,782,491 | 1/1974 | Herbenar | 280/638 |

*Primary Examiner*—Joseph F. Peters, Jr.
*Assistant Examiner*—Donn McGiehan
*Attorney, Agent, or Firm*—Arthur L. Nelson

[57] ABSTRACT

An adjustable power steering mechanism to compensate for the adjusting of the tread width on the front wheels of a tractor. The tie rod is adjusted axially by a single adjusting device on the tie rod to extend or contract the tie rod to assure the same adjustment is made on the tie rod as on the front axle. A hydraulic actuator connected between a steering arm and a bracket on the front axle has a single adjustment to compensate for the tread width adjustments on the front axle and tie rod.

10 Claims, 5 Drawing Figures

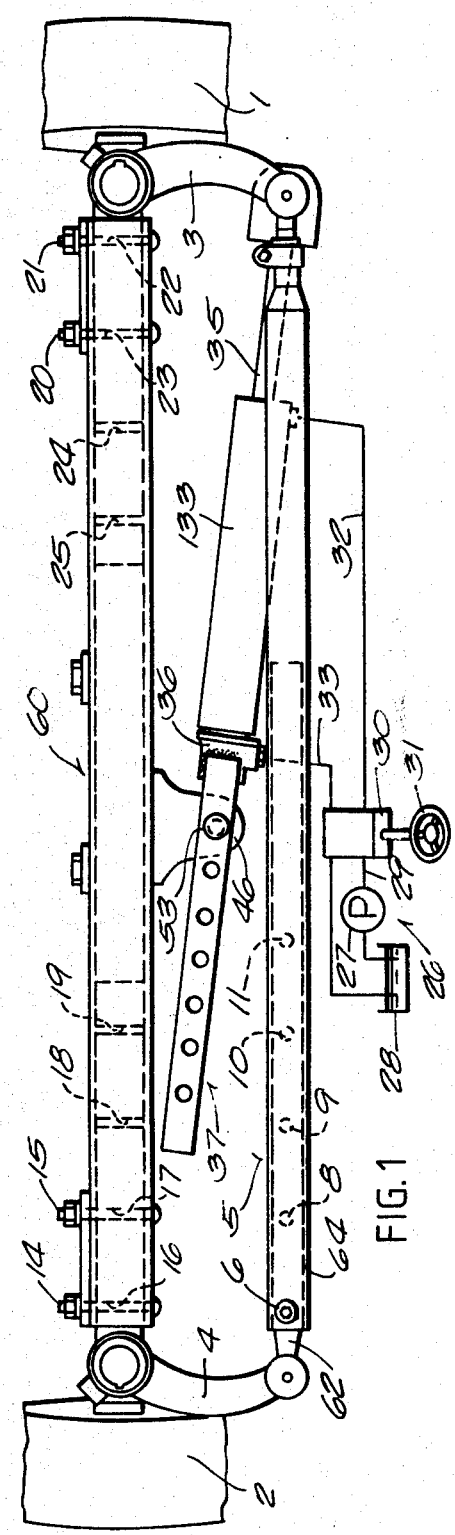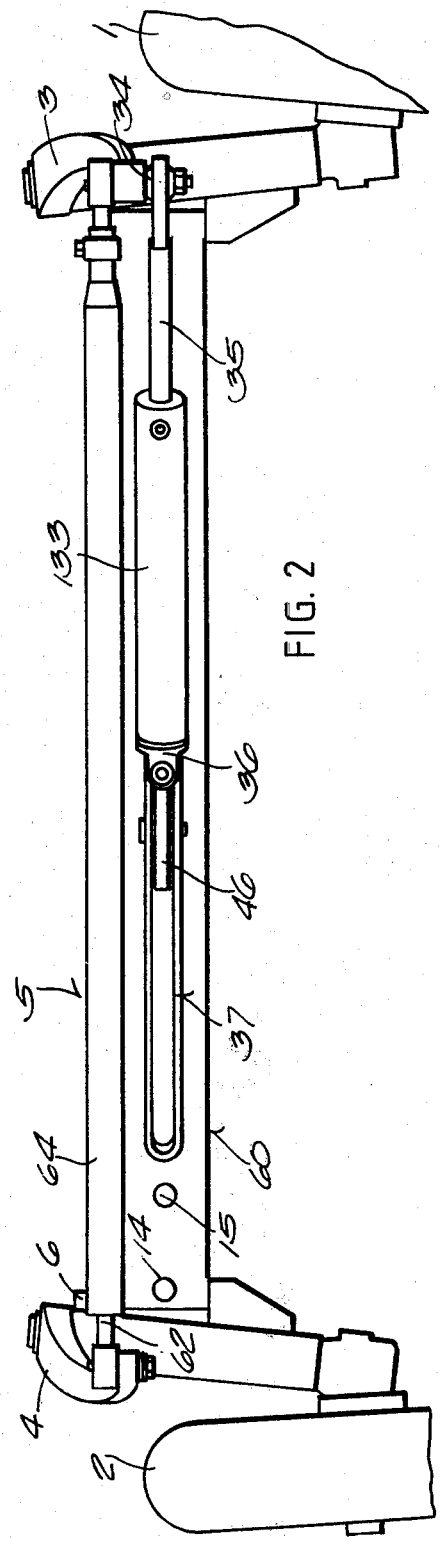
FIG.1
FIG. 2

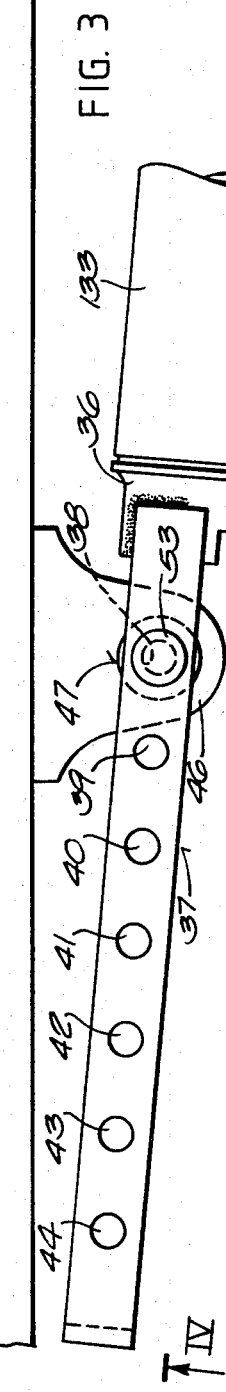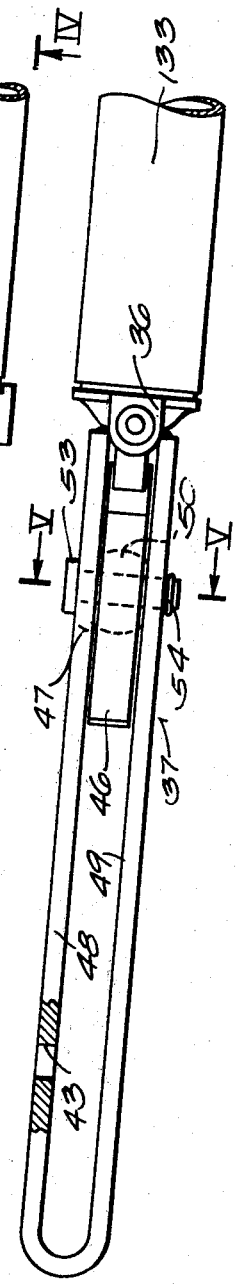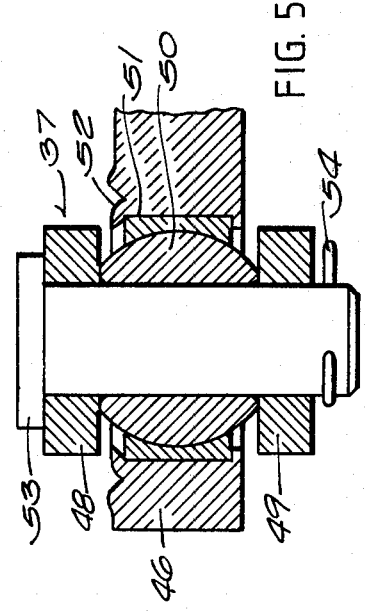

4,359,123

ADJUSTABLE POWER STEERING MECHANISM

This is a continuation, of application Ser. No. 072,831, filed Sept. 6, 1979 and now abandoned.

This invention relates to a power steering mechanism, and more particularly to an adjustable connection between the hydraulic steering cylinder and the front axle and tie rod to compensate for adjustment of the tread width of the front wheels of the tractor.

Farm tractors are usually provided with tread width adjustments on the front and rear wheels for operating in accordance with the work required by the tractor. The adjustment of the front wheels to increase or decrease the tread width requires the connection between a steering cylinder mounted on a front axle and connected to the tie rod be changed. Normally this is provided by a multiple position mounting for the steering cylinder on the axle and the change requires moving a number of bolts to shift the position of the steering cylinder to accommodate any changes in tread width of the front wheels.

Accordingly, this invention provides an adjustment on the front axle for connection of the steering cylinder to increase or decrease the dimension between the connection of the steering cylinder with the front axle and the steering arm. The change can be accomplished by removing and replacing a pin and, accordingly, simplifies the changing of tread width on the front wheels of the tractor.

It is an object of this invention to provide an adjustable steering cylinder mounting for the front wheel power steering mechanism to complement the changing of the front wheel tread width.

It is another object of this invention to provide an adjustable power steering cylinder mount on the front axle to lengthen and shorten the overall length of the steering cylinder connections between the steering arm and the front axle.

It is a further objection of the invention to provide an adjustable steering cylinder mount on the front axle connected to a pivotal point on the front axle to compensate for adjustment of the tread width of the front wheels of the tractor.

The objects of this invention are accomplished in a power steering system having a power steering cylinder connected between the steering arm on one of the front wheels and a bracket on the front axle. The connection on the front axle includes a pin carried on a long clevis forming a plurality of holes. The bracket on the front axle carries a ball and socket joint which can be selectively connected through a pin to the end of the hydraulic cylinder to selectively compensate for tread width adjustment of the front wheels of the tractor. The other end of the hydraulic cylinder is connected to the tie rod and the steering arm of the one front wheel.

Referring to the drawings, the preferred embodiment of this invention is illustrated.

FIG. 1 illustrates a plan view showing the front axle and the steering mechanism;

FIG. 2 is a rear view of the steering mechanism and front axle;

FIG. 3 is an enlarged plan view of the adjusting mechanism for the power steering cylinder;

FIG. 4 is an enlarged view of the connection between the steering cylinder and the front axle taken on line IV—IV of FIG. 3; and FIG. 5 is a view tkan on line V—V of FIG. 4.

Referring to the drawings, a steering mechanism together with the adjustable device is shown. FIGS. 1 and 2 show the front axle with the steering mechanism and the adjustable device. The front wheels 1 and 2 are steered by the steering arms 3 and 4 respectively. A tie rod 5 is connected between the steering arms 3 and 4 which is adjustable to repositioning the bolt 6 in selected holes 8, 9, 10 and 11, respectively. Similarly, the front axle can be extended by selectively positioning the bolts 14 and 15 in holes 16, 17, 18 or 19. Bolts 20, 21 can also be selectively positioned in holes 22, 23, 24 or 25. Accordingly, the front axle and tie rod can be extended to widen the tread width and with an adjustment for the steering mechanism.

The hydraulic steering system 26, includes a pump 27 receiving hydraulic fluid from the sump 28 and pressurizing fluid in the conduit 29 which is supplied to the steering control valve 30. A steering control valve is operated by the steering wheel 31 to selectively direct fluid to conduits 32 or 33 depending on the direction of the steering of the vehicle.

FIG. 2 shows the hydraulic cylinder 133 connected to the steering arm 3 through the spherical bearing 34. The rod 35 reciprocates within the cylinder 133 to steer the vehicle. The base end of the cylinder 36 carries a U-shaped clevis 37. Clevis 37 has a plurality pin holes 38, 39, 40, 41, 42, 43 and 44. The clevis 37 extends above and below the bracket 46 and the bearing 47 which is carried in the bracket. The upper portion of the clevis 48 and lower portion 49 are shown extending above and below the spherical bushing 50 which is mounted in the socket of the bushing 51. The bracket 46 supports the bearing which is forged in placed by upsetting the metal around the periphery 52 of the bearing.

The pin 53 is selectively positioned in one of the holes and extends through the spherical bushing 50 and is fastened by the cotter key 54. Repositioning the base end of the steering cylinder 133 is provided when the tread width of the vehicle is changed.

The operation of the device will be described in the following paragraphs.

The front axle 60 is adjusted to axially extend the axle by repositioning of the bolts 14, 15, 20 and 21. Adjustment of the tie rod is similar to that of the front axle by repositioning the bolt 6 in rod 62 to the sleeve 64. Adjusting the tread width of the front wheels 1 and 2 requires the adjustment of the axle and the tie rod. Since the cylinder 133 is connected to the steering arm 3 an adjustment must be made on clevis 37 of the steering cylinder to compensate for the adjustments on the tie rod and the axle. The increments of adjustment on the clevis 37 are one-half the length of the tie rod incremental adjustment. Accordingly, removal of the key 54 from the pin 53 will allow the pin to be removed from the present position in the clevis 37 and bracket 46. Repositioning of the pin in a selected hole of the clevis and in the spherical bushing 50 will then adjust the steering mechanism to provide proper steering with the adjustment for the front axle and tie rod. This adjustment can be made with minimum inconvenience and reduces the downtime.

The embodiments of the invention in which an exclusive property or privilege is claimed are defined as follows:

1. An adjustable device in a hydraulic steering system for front wheel steering of a tractor comprising, an axially adjustable front axle for adjustably varying tread width, a bracket fixed to the front axle for mounting a hydraulic steering cylinder on the front axle, a tie rod, a pair of steering arms connected to the ends of said tie rod, a single axially adjustable device on said tie rod, a hydraulic steering cylinder connected between said bracket on said front axle and one of said steering arms, a hydraulic steering cylinder adjustable mechanism on said hydraulic steering cylinder, to lengthen or shorten the effective length of said hydraulic steering cylinder between said bracket and steering arm to compensate for axial adjustment of said axle and said tie rod.

2. An adjustable device in a hydraulic steering system for front wheel steering of a tractor as set forth in claim 1 including means connecting said steering arm to said steering cylinder defining a spherical bearing.

3. An adjustable device in a hydraulic steering system for front wheel steering of a tractor as set forth in claim 1 wherein said adjustable mechanism includes means positioning said mechanism between said hydraulic cylinder and said bracket.

4. An adjustable device in a hydraulic steering system for front wheel steering of a tractor as set forth in claim 1 wherein said adjustable mechanism includes a clevis on said steering cylinder connected to said bracket.

5. An adjustable device in a hydraulic steering system for front wheel steering on a tractor as set forth in claim 1 including means defining a spherical socket on said bracket, a spherical bushing received in said socket for receiving a pin for connection to said adjustable mechanism.

6. An adjustable device in a hydraulic steering system for front wheel steering of a tractor as set forth in claim 1 including means defining a ball and socket joint on said bracket, an adjustable member on said steering cylinder, a pin extending through said ball and socket joint for connecting said adjustable member to said bracket.

7. An adjustable device in a hydraulic steering system for front wheel steering of a tractor as set forth in claim 1 including means connecting said hydraulic cylinder to said tie rod and steering arm.

8. An adjustable device in a hydraulic steering system for front wheel steering on a tractor as set forth in claim 1 including means mounting said bracket in the center portion of said front axle.

9. An adjustable device in a hydraulic steering system for front wheel steering of a tractor as set forth in claim 1 wherein an adjustable member on said steering cylinder defines a clevis of U-shaped structure with an end connected to said steering cylinder, said clevis defining an upper and lower half respectively positioned above and below said bracket on said front axle.

10. An adjustable device in a hydraulic steering system for front wheel steering of a tractor as set forth in claim 1 wherein said front axle includes means adjustably extending or contracting the length of said front axle in increments, said adjustable device on said tie rod includes means adjustably extending and contracting said tie rod in increments equal to the total adjustment for said front axle, said adjustable mechanism including means adjustably varying the length of said hydraulic cylinder approximately half of the total adjustment for said front axle or said tie rod to maintain proper steering when said hydraulic steering cylinder is adjusted relative to said front axle.

* * * * *